United States Patent [19]

LoBiondo et al.

[11] Patent Number: 5,636,008
[45] Date of Patent: Jun. 3, 1997

[54] REMOTE/SHARED SYSTEM USER INTERFACE

[75] Inventors: Martin F. LoBiondo; John A. Kusse, both of Penfield, N.Y.; Paul A. Baiter, Huntsville, Ala.

[73] Assignee: Xerox Corporation, Stamford, Conn.

[21] Appl. No.: 624,048

[22] Filed: Mar. 29, 1996

Related U.S. Application Data

[63] Continuation of Ser. No. 977,481, Nov. 17, 1992, abandoned.

[51] Int. Cl.[6] .................................................. G03G 21/00
[52] U.S. Cl. .................................................. 399/8; 399/10
[58] Field of Search ....................... 355/200, 202, 355/204, 205, 206, 207, 208, 209, 210; 364/130, 138, 188

[56] References Cited

U.S. PATENT DOCUMENTS

| | | | |
|---|---|---|---|
| 4,167,322 | 9/1979 | Yano et al. | 355/204 X |
| 4,390,953 | 6/1983 | Johnstone | 364/138 X |
| 4,583,834 | 4/1986 | Seko et al. | 355/206 |
| 4,965,676 | 10/1990 | Ejiri et al. | |
| 5,038,319 | 8/1991 | Carter et al. | |
| 5,057,866 | 10/1991 | Hill, Jr. et al. | |
| 5,077,582 | 12/1991 | Kravette et al. | 355/206 |
| 5,084,875 | 1/1992 | Weinberger et al. | |
| 5,184,179 | 2/1993 | Tarr et al. | 355/206 |
| 5,202,726 | 4/1993 | McCulley et al. | 355/206 |
| 5,214,772 | 5/1993 | Weinberger et al. | 355/202 X |
| 5,220,380 | 6/1993 | Hirata et al. | 355/204 |

*Primary Examiner*—Sandra L. Brase
*Attorney, Agent, or Firm*—Olif & Berridge

[57] ABSTRACT

A remote user interface provided for accessing diagnostic information from reprographic equipment, thereby enabling display of service and fault history and allowing manipulation of diagnostic routines by emulation or mimicking of the user interface commands of the user interface associated with the faulted machine. As a result, service personnel can remotely access a faulted machine and manipulate it via its diagnostic system or diagnostic system that can emulate its diagnostic systems to allow improved preparation for service calls and the lessening of broken service calls for lack of appropriate service information, replacement parts or test equipment.

4 Claims, 3 Drawing Sheets

REMOTE/SHARED SYSTEM USER INTERFACE

This is a continuation of application Ser. No. 07/977,481 filed Nov. 17, 1992, now abandoned.

BACKGROUND OF THE INVENTION

1. Field of the Invention

This invention relates to document systems. It has particular applicability to reprographic systems having diagnostic capabilities.

2. Description of Related Developments

Reprographic machines having internal diagnostic capabilities are known. These machines can display a visual message to an operator indicating the existence of a common fault (for example, a paper jam) and give instructions for removal of the fault. Recently, reprographic machines with enhanced diagnostic capabilities yielding information useful to service engineers have been developed. These machines employ controllable user interfaces, such as touch screen video displays, for controlling operation of the machine and diagnosing faults. Systems for monitoring the operation of a plurality of these machines from a remote source by use of a powerful host computer having advanced, high level diagnostic capabilities have been installed. These systems have the capability to interact remotely with the machines being monitored to receive automatically or manually initiated requests for diagnosis and to interact with the requesting machine to request and receive stored operating parameter data to enable higher level diagnostic analysis. Such systems are shown in U.S. Pat. Nos. 5,038,319 and 5,057,866 (the disclosures of which are incorporated herein by reference), owned by the assignee of the present invention. These systems employ Remote Interactive Communications (RIC) to enable transfer of selected machine operating data (referred to as machine physical data) to a remote site, at which the host computer is located, through a suitable communication channel. The machine physical data may be transmitted from a monitored document system to the remote site automatically at predetermined times and/or in response to a specific request from the document system. Alternatively, as shown in the above-noted patents, information may be provided to a personal computer at the remote site, that is capable of interacting with a remote document system for modifying alarm parameters within the remote system.

In a typical RIC system, the host computer is linked via a dedicated and/or public telephonic transmission system to local reprographic machines via modems. The host computer may include a compiler to allow communication with a plurality of different types of machines and an expert diagnostic system that performs higher level analysis of the machine physical data than is available from the diagnostic system in the machine. After analysis, the expert system can provide an instruction message which can be utilized by the machine operator at the site of the document system to overcome a fault. Alternatively, if the expert system determines that more serious repair is necessary or preventive maintenance is desirable, a message is sent to a local field work support office giving the identity of the machine and a general indication of the type of service action required. This information is then transmitted, usually orally, from a service dispatcher to a service technician. The system is disadvantageous from the standpoint that the communication between the dispatcher and the service technician is usually oral, the service dispatcher commonly has only limited information about the technical aspects of the machine requiring repair and the dispatcher normally has little time to spend in communicating the information. The result is that the field service technicians receive only limited information relating to the identity of the machine requiring service and brief indications of the primary problem or repair action. The service technician does not get historical machine operating data, service history or detailed descriptions of potential problems. As a result, the field service technician has incomplete information and may find that machine repair cannot be fully effected during the first repair visit because of the need for parts or test equipment not routinely carried by the technician. The result is a broken service call. Such broken service calls irritate the machine user because the equipment is not quickly returned to full service. Broken service calls are also expensive to the servicing organization because of the need to send a service representative more than one time for the same repair.

SUMMARY OF THE INVENTION

This invention provides for more productive service calls by allowing access to the diagnostic systems or machine physical data of a faulted machine from a machine user interface at a remote location, using the diagnostic system within the faulted machine, or a local diagnostic system compatible with the faulted machine, and using user interface inputs that mimic or emulate those of the machine to be serviced. This allows remote retrieval of the machine physical data and remote preparation and transmission of diagnostic inquiries and commands that are the same as, and compatible with, those used to diagnose the faulted machine via the user interface at the machine.

DESCRIPTION OF PREFERRED EMBODIMENTS

Figure 1:
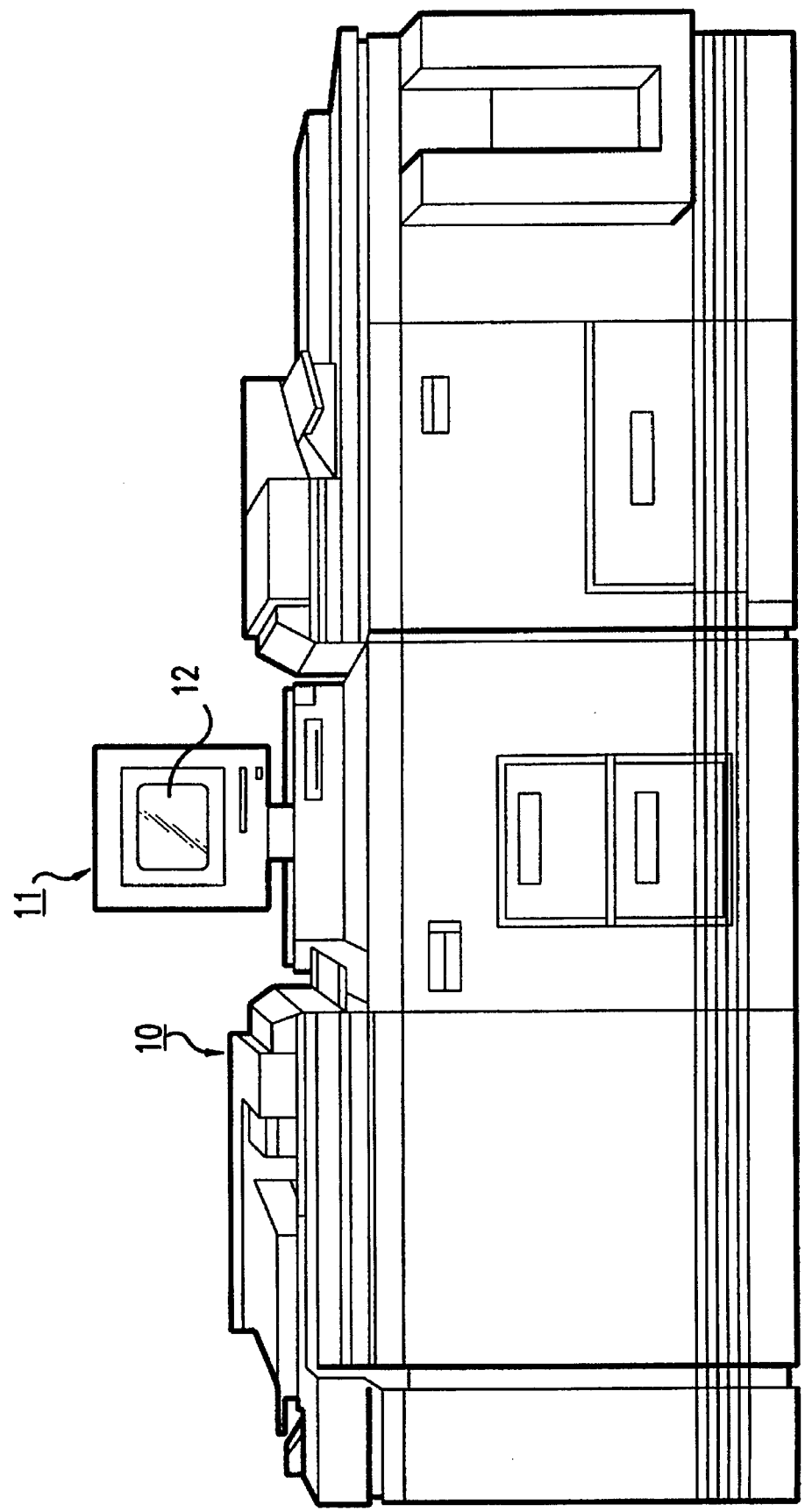
FIG. 1 shows a typical reprographic machine having a user interface.

Referring to FIG. 1, there is shown an electrophotographic reproduction machine 10 composed of a plurality of programmable components and subsystems which cooperate to carry out the copying or printing jobs programmed either through a touch dialog screen 12 of a user interface (UI) 11 or via a network connection. Internal operating systems of the machine 10 are disclosed in U.S. Pat. Nos. 5,038,319 and 5,057,886 and no further detailed description thereof is necessary.

Figure 2:
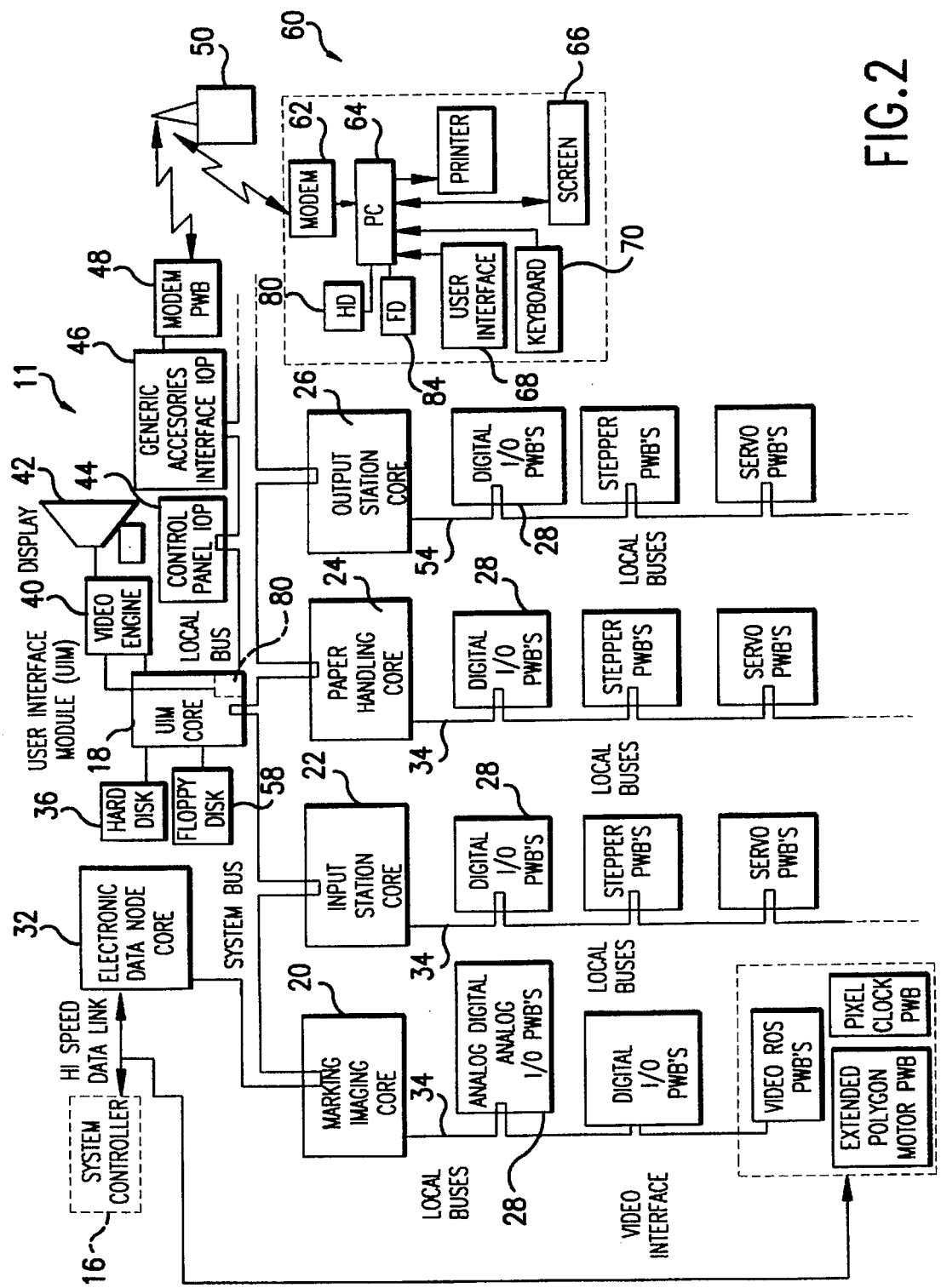
FIG. 2 is a schematic diagram of reprographic equipment having a user interface, which equipment is associated with a remote user interface.

Referring to FIG. 2, operation of the various components of machine 10 is regulated by a control system which uses operating software stored in memory in the system controller 16 to operate the various machine components in an integrated fashion to produce copies and prints. The control system includes a plurality of printed wiring boards (PWBs), there being a user interface module core PWB 18, a marking imaging core PWB 20, an input station core PWB 22, a paper handling core PWB 24 and an output station core PWB, together with various input/output (I/O) PWBs 28. A shared line (SL) 30 couples the core PWBs 18, 20, 22, 24 and 26 with each other and with the electronic data node core 32, while local buses 34 serve to couple the I/O PWBs to the respective cores and to stepper and servo PWBs. Programming and operating control over machine 10 is accomplished through touch dialogue screen 12 of UI 11 or via the system controller 16. The operating software includes application software for implementing and coordinating operation of the machine components.

Hard disk port 36 and floppy disk port 38 provide program loading access to UIM core PWB 18 for the purpose of entering changes to the operating software, loading specific programs, such as diagnostic programs, and retrieving stored data, such as machine history data and fault data, etc. using floppy disks.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides for the transfer of machine physical data and interface commands to and from the UIM core 18.

The modem 48 provides communication through a suitable communications channel, such as a public switched telephone network. The communications link can include radio frequency or cellular links to vehicles or other mobile telephone equipment.

The system includes a remote user interface 60. The remote user interface 60 can be implemented as a stand-alone unit, such as a personal computer located at a field service center, a lap-top or portable personal computer carried by a service engineer or the user interface of another reprographic machine remote from the machine 10. A typical form of remote user interface is a portable lap-top personal computer 64 that includes a modem 62 linked to the communications channel, a display screen 66, a user interface processor (for a mouse, touchscreen or other manually directed input), and a keyboard 70.

Figure 3:
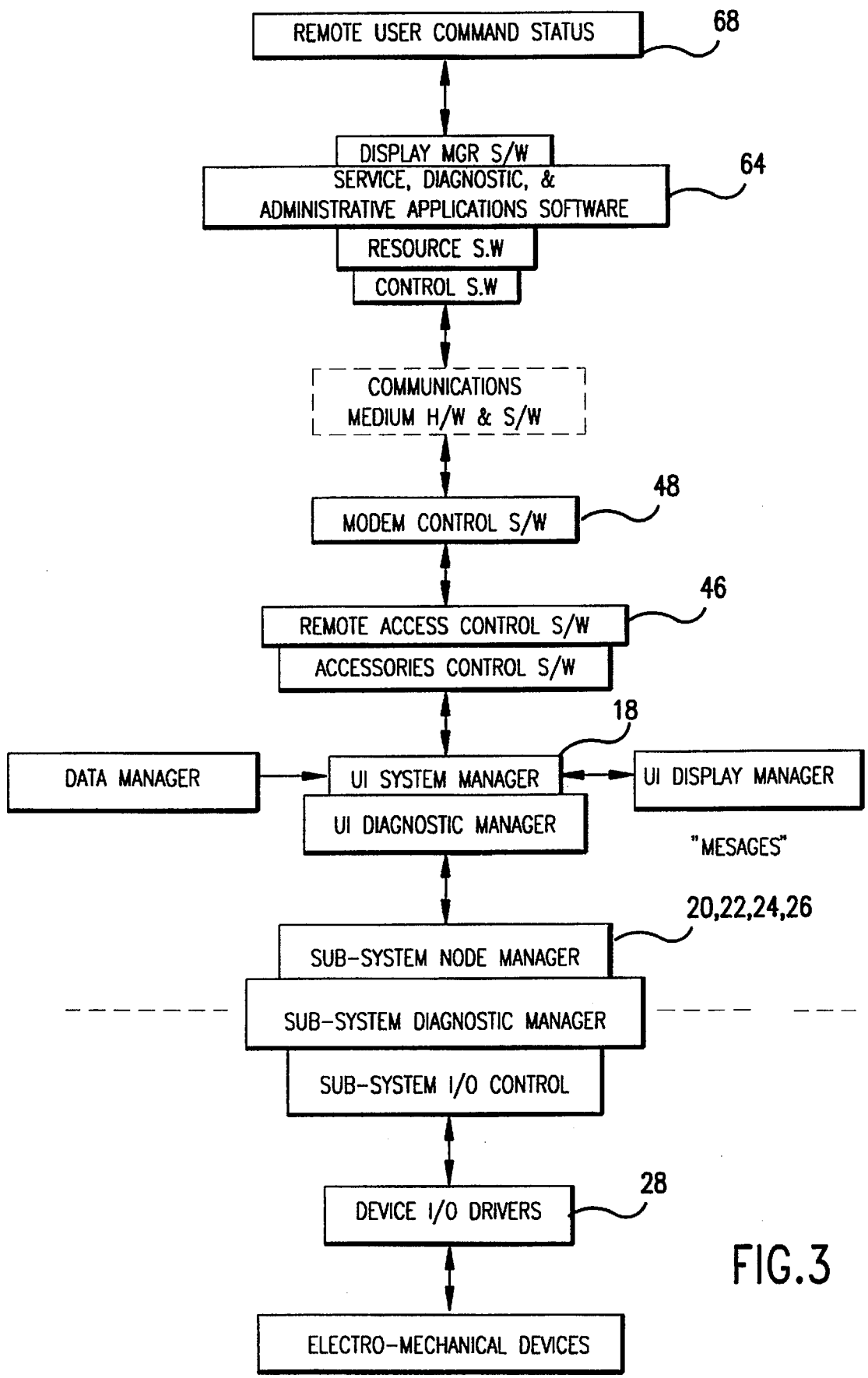
FIG. 3 is an illustration of the information flow in the system illustrated in FIG. 2.

FIG. 3 shows the flow of information in the system depicted in FIG. 2. Information in the form of signals to or from the electromechanical devices on the digital I/O PWBs, servo PWBs and stepper PWBs is transferred to and from the digital core 20, 22, 24, 26 PWBs. Information from and control information to the PWBs 28 is centralized through the subsystem cores, such as cores 20, 22, 24 and 26. These cores include, as illustrated in FIG. 3, software routines comprising the subsystem input/output control, the subsystem diagnostic manager and the subsystem node manager.

The information from the subsystem cores flows to and from the UIM core 18, which embodies software control systems including a user interface system manager and a user interface diagnostic manager. The UI system manager includes a UI display manager subsystem for controlling the display of messages on the display 42 or on the display of the remote user interface 60. A data manager subsystem provides data management to the user interface system manager. The UIM core 18 includes a local/remote switch, preferably implemented in software by a microprocessor 80, or a portion of the processor forming UIM core 18, for routing user interface display information to the video engine of the local user interface unit 11 or to the generic accessories interface processor 46 for transmission to the remote user interface 60. The local/remote switch is actuated to the remote position upon recognition of appropriate command codes transmitted from the manually actuated command input, such as the touch screen of the local user interface 11 or the touchscreen of remote user interface 60.

The local/remote switch can be implemented by a flag setting routine for controlling the flow of data to the local user interface 11 or the remote user interface 60. In this case, the command data stream from each of user interfaces 11, 60 can include an identifier bit. The presence (or absence) of information at the identifier bit location can indicate whether the data stream is from local user interface 11 or remote user interface 60. The local/remote switch includes a discriminator for performing a discrimination step, in which the identifier bit from each incoming data stream is read and a flag is set in memory upon detection of data at the identifier bit location. For example, the flag may be set when commands are received from the remote user interface 60. The command data stream then proceeds to the user UI Diagnostic Manager (FIG. 3) for performance of the diagnostic routines requested in the command data stream. When the results of the requested diagnostic routines are to be displayed, the UI System Manager, which includes the local/remote switch, looks for the presence of the flag and determines the appropriate interface for receiving the diagnostic results. Thus, if a set flag indicates a command received from the remote user interface 60, the switch will direct the display data stream to the generic accessories interface IOP 46, which provides the display information via the communications channel to remote user interface 60. If no flag is detected, the data stream from the UI System Manager is directed to local user interface 11.

A two-way flow of information from the user interface system manager of core 18 is provided through the generic accessories interface input/output processor 46, which includes remote access control software and accessories control software. Information from and to the generic accessories interface processor 46 is controlled by modem control software in the UIM core 18 and generic accessories IOP or communications board 46. That information is transferred via a public switched telephone network, dedicated transmission network, or other data transmission network to the personal computer 64, or other user interface, located at a site remote from the machine 10.

The personal computer 64 includes control software, resource software, service, diagnostic and administrative application software and display management software for directing and controlling the information flowing to and from the personal computer 64. The display management system is primarily the same as that used in the display manager subsystem in the UIM core 18 of each machine 10 accessible by remote interface 60. Thus, service personnel at the remote user interface 60 are provided with a pathway via the remote user interface 60 to all of the basic machine functions of reprographic machine 10, thereby providing access to machine physical data, machine operating parameters or crash data from non-volatile memories and diagnostic routines, and providing for the manipulation of the diagnostic system of the machine from the location of the remote user interface. Protocol messages entered at the command/status level can be used to obtain status information.

In another embodiment, user interface management programs and diagnostics programs that are the same as or compatible with several different types of reprographic machines 10 can be stored in dedicated portions of the memory of personal computer 64. For example such programs can be stored on hard disk 86, accessible for changes and updates through typical I/O ports associated with personal computer 64, such as a floppy disk port 84. When using a remote user interface having a dedicated, stored diagnostic program, it is useful to use a hierarchical arrangement of diagnostic systems for use with differing types of machines being monitored. That is, standard subroutines for each diagnostic procedure are used across a line of machines, with the primary difference between diagnostic capabilities being the number of standard diagnostic subroutines making up the complete diagnostic system. With such an arrangement, the highest level diagnostic system can be stored in and used in the remote user interface 60 for performing remote diagnoses on machine types having differing levels of diagnostic capabilities.

In a third embodiment, the display management and diagnostic systems can be downloaded directly onto hard disk 86 through the communications channel, each time the remote user interface 60 is linked to a faulted machine 10. In the latter two cases, the remote user interface 60 must also obtain machine physical data from the faulted reprographic machine to obtain the diagnostic results. In all three embodiments, the remote user interface 60 is enabled to emulate or mimic the user interface system 11 of the faulted machine 10. Thus a technician at the remote interface 60 can perform all of the routines and obtain all of the data available at the site of the faulted machine.

It is desirable, when the remote user interface 60 is being used to manipulate the machine 10 to perform certain diagnostic procedures, to prevent operation of the machine 10. This is achieved via a software locking routine in UIM core 18. During this time, the UIM core 18 locks out the touch screen 12 so that the local user interface 11 cannot be used to initiate operation of the machine. The lock out routine will supply a message on the interface 11 that operation is prevented because remote servicing operations are taking place. Such systems are known and a detailed description of them is not necessary.

Also, a security system is used for restricting access through the remote user interface 60 to appropriate service personal using unique identifiers. In addition, hardware and software encrypting and deciphering facilities are located in the generic accessories input output processor 46 and in the personal computer 64 for providing secure communications between the machine 10 and the remote user interface 60. Such systems are known to those of skill in the art and no further detailed description thereof is necessary.

The advantages of the above-described system are manifold. The system provides the capability for a service technician to gain access to a remote, disabled reprographic machine from a branch service center, while in transit via a mobile communications or cellular link, or from a location where a machine having a similar user interface is located. The remotely located technician has the capability to interact with the diagnostic system of the faulted document system using the same interface routines available on site. As a result, more complete information regarding the fault is available to the service technician. Preliminary steps can be taken remotely for removing the fault or, on the basis of the more complete information about the fault or the machine history, appropriate repair parts or testing equipment can be obtained by the service technician prior to arrival at the site of the faulted machine, thereby lessening the likelihood of a broken service call because of the necessity to leave the site to obtain replacement parts and then return to make the necessary repair and replacement actions. The system avoids the need for communication with an intermediary host computer to derive needed service information. Further, the system avoids the need for a remote interface having specific diagnostic routines and allows use of a single remote interface for document systems having differing diagnostic systems and capabilities.

The system also provides the capability to go back to the faulted machine for a second look, after the first call for service, to obtain an updated status of the machine, which may enable the determination of more appropriate service routines. Also, the system allows changes to be made in operating or control parameters stored in the non-volatile memory of the faulted machine, thereby enabling servicing to be accomplished remotely, without the need for a service call.

What is claimed is:

1. A servicing system for reprographic equipment comprising:

a plurality of reprographic machines, each of the plurality of machines having a diagnostic system for diagnosing faults in the reprographic machine by performing a diagnostic analysis routine on the reprographic machine, a controllable local user interface for controlling the diagnostic system of the machine, an interface management system for providing diagnostic information from the diagnostic system for display on a user interface, a first communication means for establishing communications between said interface management system and a location external to the site of the reprographic machine, the interface management system including means for directing the diagnostic information to the local user interface or to the first communication means; and at least one remote user interface, said remote user interface including second communication means for effecting a communication link between the remote user interface and the first communication means of each of said plurality of reprographic machines, the remote user interface including means for emulating the diagnostic system and the local user interface of a machine to which the remote user interface is connected by the first and the second communication means by receiving machine physical data from the machine and performing the diagnostic analysis routine at the remote user interface on the machine physical data, wherein the remote user interface comprises the user interface of one of said plurality of reprographic machines.

2. The servicing system of claim 1, wherein the first and second communication means comprise modems for establishing communications through a telephonic network.

3. A servicing system for reprographic equipment comprising:

a plurality of reprographic machines, each of the plurality of machines having a diagnostic system for diagnosing faults in the reprographic machine by performing a diagnostic analysis routine on the reprographic machine, a controllable local user interface for controlling the diagnostic system of the machine, an interface management system for providing diagnostic information from the diagnostic system for display on a user interface, a first communication means for establishing communications between said interface management system and a location external to the site of the reprographic machine, the interface management system including means for directing the diagnostic information to the local user interface or to the first communication means; and at least one remote user interface, said remote user interface including second communication means for effecting a communication link between the remote user interface and the first communication means of each of said plurality of reprographic machines, the remote user interface including means for emulating the diagnostic system and the local user interface of a machine to which the remote user interface is connected by the first and the second communication means by receiving machine physical data from the machine and performing the diagnostic analysis routine at the remote user interface on the machine physical data, wherein each of the reprographic machines includes a discriminator for discriminating between a command data stream from an associated local user interface and a data stream from the remote user interface.

4. The servicing system of claim 3, wherein the discriminator includes reading means for reading identifier information in a data stream, storing means for storing the identifier information, and means for directing the data stream to the local user interface or the remote user interface in accordance with the information stored in the storing means.

* * * * *